United States Patent [19]

Stumpf

[11] Patent Number: 5,152,580

[45] Date of Patent: Oct. 6, 1992

[54] HANDLE ASSEMBLY FOR CHAIR CONTROL MECHANISM

[75] Inventor: William S. Stumpf, Kitchener, Canada

[73] Assignee: Faultless-Doerner Manufacturing Inc., N. Waterloo, Canada

[21] Appl. No.: 774,651

[22] Filed: Oct. 15, 1991

Related U.S. Application Data

[63] Continuation of Ser. No. 544,969, Jun. 28, 1990, abandoned.

[51] Int. Cl.$^5$ .............................................. B60N 2/10
[52] U.S. Cl. ..................................... 297/304; 74/553; 74/557
[58] Field of Search ............................... 297/302–305; 16/118, 121, DIG. 24; 74/553, 557

[56] References Cited

U.S. PATENT DOCUMENTS

| | | | |
|---|---|---|---|
| 2,208,561 | 7/1940 | Jungbauer | 297/305 |
| 2,329,327 | 9/1943 | Boerner | 297/304 X |
| 2,538,507 | 1/1951 | Cramer | 297/304 X |
| 4,909,472 | 3/1990 | Piretti | 297/302 X |

Primary Examiner—Kenneth J. Dorner
Assistant Examiner—J. Bonifanti
Attorney, Agent, or Firm—Fetherstonhaugh & Co.

[57] ABSTRACT

A chair control mechanism of the type having a seat support member pivotally mounted on a leg mounting member, and a spring loaded adjustment mechanism for controlling the pivotal movement of one member with respect to the other. The adjustment mechanism includes a handle mounted on an adjustment screw for movement therealong to compress or allow extension of the compression spring. A nut is threadedly mounted on the adjustment screw and serves to retain the members, adjustment screw and spring in an assembled configuration during shipping to and assembly of a chair by a chair manufacturer. A hand wheel is provided for attachment to the nut after the control mechanism has been assembled and installed in a chair. The hand wheel has a body of plastics material in which a seat formed which is proportioned to accommodate and adapted to cooperate with the nut such that when the nut is seated therein, rotation of the hand wheel will cause rotation of the nut with respect to the adjustment screw. The seat also cooperates with the nut to prevent removal of the nut therefrom. The body of plastics material is sufficiently flexible to permit resilient deformation of the seat to admit the nut thereto.

2 Claims, 1 Drawing Sheet

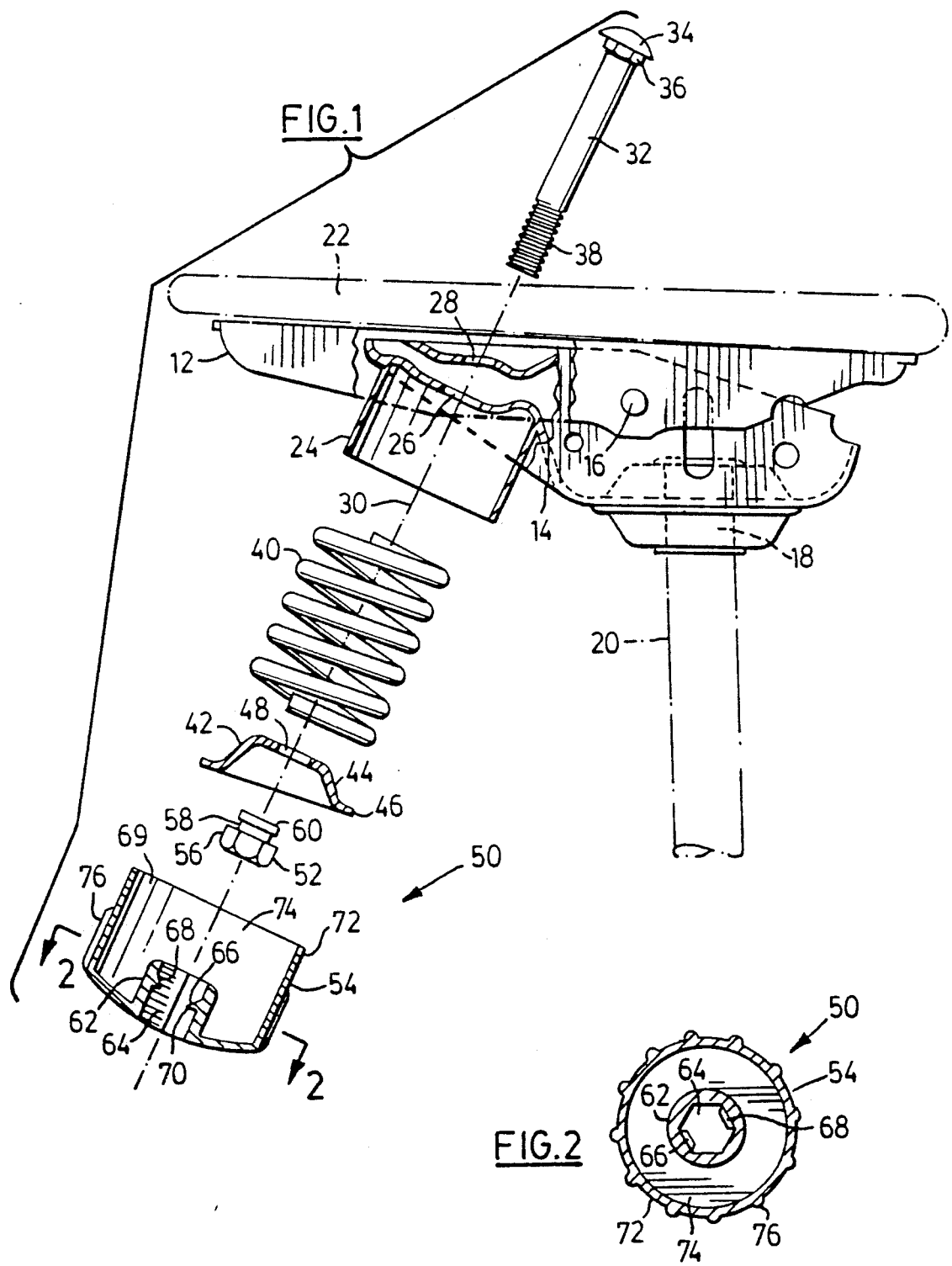

HANDLE ASSEMBLY FOR CHAIR CONTROL MECHANISM

This application is a continuation of application Ser. No. 07/544,969, filed Jun. 28, 1990 now abandoned.

BACKGROUND OF INVENTION

This invention relates to chair control mechanisms. In particular, this invention relates to improvements in the adjustment handle of a chair control mechanism.

Chair control mechanisms are used to connect the leg of a chair to a chair seat and in some cases to the backrest of a chair such as the type of chair commonly referred to as an office chair. These control mechanisms are manufactured and assembled in a metal forming and stamping operation and commonly comprise a seat support member that is pivotally mounted on a leg mounting member and an adjustment screw, compression spring and handle that cooperate with one another to preload the chair control mechanism to control the movement of the seat support member with respect to the leg mounting member.

For aesthetic purposes, it is common practice to paint the handle so that it is colour coordinated with the colour of the chair control mechanism or the colour of the fabric of the chair in which the control mechanism is incorporated in use. The manufacturer of chair control mechanisms frequently finds that quality control complaints are received because the paint applied to the handle is scratched or otherwise damaged during the assembly of the chair control mechanism and/or the shipping of the control mechanism to the chair manufacturer or during the assembly of the chair. As a result, the manufacturer of chair control mechanisms generally produces a greater number of handles than might otherwise be required in order to provide a ready source of replacements.

To provide for the ease of manual manipulation, the handle is generally quite large with the result that it is susceptible to damage by contact with other objects during the assembly of the chair control mechanism and the shipping and handling of the preassembled control mechanism and the installation of the control mechanism into a chair.

SUMMARY OF INVENTION

It is an object of the present invention to provide a two-part handle for a chair control mechanism which will permit the control mechanism to be preassembled using an element which is subsequently covered by a second element which can be attached to the first element after installation of the control mechanism into a chair.

According to the present invention, there is provided a chair control mechanism of the type having a seat support member pivotally mounted on a leg mounting member, and means for controlling the pivotal movement of said members with respect to one another including an adjustment screw, a compression spring and a handle mounted on the adjustment screw for movement therealong to compress or allow extension of the compression spring. The improvement in the handle comprises a nut that is threadably mounted on the adjustment screw and serves to retain the adjustment screw and compression spring to the seat support member and leg mounting member in an assembled configuration during shipping to and assembly of a chair by a chair manufacturer, the nut having a plurality of appreciably flat side faces and having an annular recess. A hand wheel is included and comprises a body of a deformable and resilient plastic material having a sleeve formed therein which is proportioned to receive and cooperate with said nut. The sleeve of the hand wheel has a bore extending therethrough for receiving the nut. The sleeve has a plurality of appreciably flat side faces bordering the bore, at least some of which are located adjacent some of the side faces of the nut to prevent substantial rotational movement of the nut with respect to the handwheel and arranged to bear against the side faces of the head of the nut during rotation of the hand wheel to permit torque forces to be transferred from the hand wheel to the nut such that when the nut is seated within the sleeve, rotation of the hand wheel will cause rotation of the nut with respect to the adjustment screw. The hand wheel is provided with detent means projecting into the bore from the sleeve and the hand wheel, the sleeve and the detent means are of unitary construction. The detent means is shaped and proportioned so that during assembly, the hand wheel may be pushed over the nut so that the nut is received by the bore in the sleeve and the detent means resiliently deforms over the head portion of the nut until the detent means extends into the annular recess of said nut thereby preventing axial movement of the hand wheel with respect to the nut. The detent means does not restrict rotational motion of the hand wheel relative to the nut.

IN THE DRAWINGS

The invention will be more clearly understood after reference to the following detailed specification read in conjunction with the drawings wherein;

FIG. 1 is a partially exploded side view of a chair control mechanism constructed in accordance with an embodiment of the present invention; and FIG. 2 is an end view of the hand wheel taken along the line 2—2 of FIG. 1.

With reference to the drawings, the reference numeral 10 refers generally to a chair control mechanism. The chair control mechanism 10 includes a seat support member 12 which is pivotally mounted on a leg support member 14 by means of a pivot pin 16. A socket 18 is formed in the leg support member 14 to receive a leg or support post 20 of a chair in use, shown in ghost outline in FIG. 1. The seat support member serves to support a seat pad or cushion assembly 22. A collar 24 is mounted on the underside of a portion of the back support member 14. Passages 26 and 28 are formed in the leg support member 14 and the seat support member 12 and are aligned with one another along the axis 30. Adjustment screw 32, in the form of a coach bolt having an enlarged head 34 and a square projection, 36 extend downwardly from the head 34. A threaded end portion 38 is located adjacent to the free end of the adjustment screw.

A compression spring 40 is provided which is proportioned to fit freely within the collar 24. A pressure plate 42 is provided which serves to be against the spring 40. The pressure plate 42 has a nub 44 that extends into the core of the coil spring and a flange 46 that extends over the end of the coil spring. Pressure plate 42 is provided with a passageway 48 extending therethrough of sufficient size to receive screw 32.

All of the structural elements described to this point are conventional components of a chair control mechanism and have not, therefore, been described in great detail.

The reference numeral 50 refers generally to a handle which is a two-part handle that includes a small nut 52 and a large hand wheel 54.

The small nut 52 has a threaded bore (not shown) that is proportioned to threadably engage the threaded end 38 of the adjustment screw 32. The small nut 52 has a hexagonal to head portion 56 at one end thereof. An annular recess 58 is formed in a tubular portion 60 which projects axially from the head 56.

The large hand wheel 54 is formed with a sleeve portion 62 which has a bore 64 that extends therethrough. The sleeve portion 62 has detents 66 that project inwardly thereof into bore 64. The detents 66 have an inclined face 68 directed toward the open end 69 of the hand wheel and a radially extending face 70 which forms a shoulder that is directed toward the opposite end of the hand wheel. The bore 64 is hexagonal in cross section as shown in FIG. 2 of the drawing and is proportioned to receive the head portion 56 of the nut in a close-fitting relationship. The detents 66 are proportioned to extend into the annular recess 58 and serve to retain the large hand wheel 54 on the small nut 52.

The large hand wheel 54 also has a cap 72 which has a bore 74. Ridges 76 are formed on the exterior face of the cap 72 and serve to provide finger gripping ridges which facilitate manual engagement of the hand wheel for rotation thereof in use.

The seat support member 12 and leg support member 14 are fabricated in the conventional manner and are pivotally connected to one another by means of the pivot pin 16. The adjustment screw 32 is mounted so that it extends through the passages 28 and has its square projection 36 seated in the uppermost passage 26 and 28 which is also a very square configuration to receive the radial projection 36 and retain the bolt against rotation. The compression spring 40 is seated in the collar 24. The pressure plate 42 is also positioned over the end of the spring 40 with the threaded end portion 38 of the adjustment screw 32 extending through the passageway 48. The small nut 52 is then threadedly mounted on the threaded end 32. This assembled chair control mechanism may be packaged and shipped to the chair manufacturer without attaching the handle 50 to the small nut 52.

The handle 50 may be made from a plastic material and may be an injected moulded handle. The handle 50 may be formed from a plastics material which has a predetermined colour chosen to coordinate with the colour scheme of the chair. The handles may be shipped to the chair manufacturer separate from the remainder of the chair control mechanism or they may be separately packaged in a protective covering and shipped one with each chair control mechanism.

When the chair control mechanism is received by the chair manufacturer which may be within the same manufacturing organization as that which produces the chair control mechanism or it may be a distinctly different manufacturing company. When the chair control mechanism is received, it is assembled to form a chair by attaching a seat pad 22 and leg 20 and other structural components such as a' backrest support all in a conventional manner. All of this assembly can be carried out without a need to attach the handle to the small nut 52. Once the chair has been assembled, the handle 50 may then be attached to the small nut 52. This can be achieved simply by forcing the bore 64 of the handle over the hexagonal-shaped head portion 56 of the small nut until the detents 66 enter the annular recess 58. The inclined faces 68 of the detents serve to facilitate the passage of the large head portion 56. Once the handle 50 has been mounted on the nut 52, rotation of the handle 50 will cause rotation of the nut 52 to adjust the pressure applied by the compression spring 40 in a conventional manner. It will be seen that by delaying the final step of assembly of the handle 50 it is possible to avoid damaging the surface finish of the hand wheel 54 during the initial assembly of the chair control mechanism and during the installation of the chair control mechanism in a chair. It will be understood that the hand wheel 54 may also be painted to provide the required colour coordination. The fact that it is possible to delay the mounting of the hand wheel 54 on to the small nut 52 until the remainder of the assembly has been completed also serves to ensure that a paint finish is not damaged during the prior assembly procedures.

From the foregoing, it will apparent that the handle assembly of the present invention serves to reduce the likelihood of damage to the surface finish of the adjustment handle in advance of the point of sale of the assembled chair.

I claim:

1. In a chair control mechanism of the type having a seat support member pivotally mounted on a leg mounting member, and means for controlling the pivotal movement of said members with respect to one another including an adjustment screw, a compression spring and a handle mounted on the adjustment screw for movement therealong to compress or allow extension of the compression spring, the improvement wherein the handle comprises:
   a) a nut that is threadably mounted on the adjustment screw and serves to retain said adjustment screw and compression spring to said seat support member and leg mounting member in an assembled configuration, during shipping to and assembly of a chair by a chair manufacturer, the nut having a plurality of appreciably flat side faces and having an annular recess, and
   b) a hand wheel comprising a body of a deformable and resilient plastic material having a sleeve formed therein which is proportioned to receive and cooperate with said nut, said sleeve of said hand wheel having a bore extending completely therethrough for receiving said nut, the sleeve having a plurality of appreciably flat side faces bordering the bore, at least some of which are located adjacent some of the side faces of said nut to prevent substantial rotational movement of the nut with respect to the hand wheel and arranged to bear against at least a portion of the side faces of the head of the nut during rotation of the hand wheel to permit torque forces to be transferred from the hand wheel to the nut such that when the nut is seated within said sleeve, rotation of the hand wheel will cause rotation of the nut with respect to the adjustment screw, the hand wheel provided with detent means projecting into the bore from said sleeve, the hand wheel, the sleeve and the detent means being of unitary construction, the detent means being shaped and proportioned so that during assembly, the hand wheel may be pushed over the nut so that the nut is received by the bore in the sleeve and the detent means resiliently deforms over the head portion of the nut until the detent means extends into the annular recess of said nut thereby preventing axial movement of the hand wheel relative to the nut said detent means by itself not restricting rotational movement of the hand wheel relative to the nut.

2. A control mechanism according to claim 1 wherein said detent means comprises at least two projections each located on a different face bounding said bore, and wherein said nut is provided with a tubular portion which extends axially from the head portion, the annular recess located in said tubular portion and being circumferentially disposed thereabout.

* * * * *